Jan. 4, 1966    E. KNOWLES    3,227,596
METHOD OF BONDING SYNTHETIC YARN FABRICS TO
RUBBER AND SYNTHETIC POLYMERS
Filed June 20, 1962
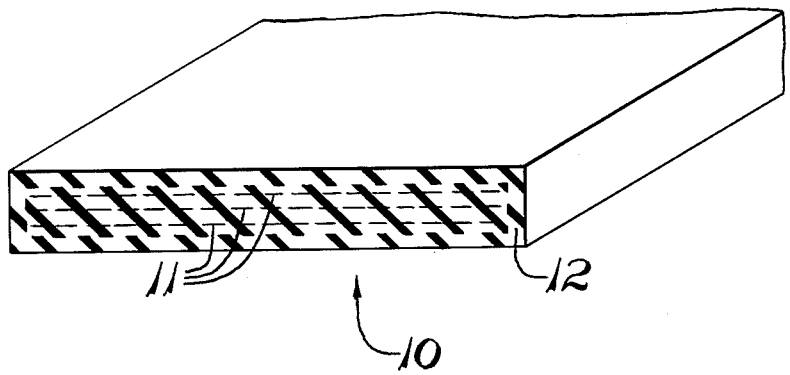
INVENTOR.
ERIC KNOWLES
BY
*James G. Lindsay*
ATTY.

United States Patent Office

3,227,596
Patented Jan. 4, 1966

3,227,596
METHOD OF BONDING SYNTHETIC YARN FABRICS TO RUBBER AND SYNTHETIC POLYMERS
Eric Knowles, Blackpool, England, assignor to BTR Industries Limited, London, England, a British company
Filed June 20, 1962, Ser. No. 202,712
1 Claim. (Cl. 156—242)

The present invention is a composition for coating synthetic yarn fabric and particularly for bonding synthetic yarn fabric to rubber or a rubber-like material. The invention is also directed to a method of applying the composition to the synthetic yarn fabric.

The problem of bonding natural and synthetic rubbers and polymers such as polyvinyl chloride to synthetic yarn fabrics has been a difficult one to overcome. One of the objects of the present invention is to provide a solution to this problem particularly in the production of conveyor belting and fabric hose by using a particular composition which is applied to the synthetic yarn fabric by a specific technique.

Accordingly, the present invention is a composition for coating synthetic yarn fabric and bonding the fabric to rubber or polyvinyl chloride which comprises a solvent-free blend of (i) rubber or (ii) a polymer of vinyl chloride or (iii) a copolymer of vinyl chloride and vinylidene chloride or a mixture of such components and a polyisocyanate. A secondary polymer may be added to the composition and other components, for example, plasticizers, fillers, peptizers, oils, anti-static agents, flame retardant agents, carbon black, vulcanizers or fungicides may also be added. A further feature of the present invention is the application of the composition according to the present invention to the synthetic yarn fabric by means of a frictioning technique which involves coating the fabric with the solvent-free composition which is introduced into the fabric under certain conditions of temperature and pressure. Another feature of the present invention is the addition of a protective layer of rubber or synthetic polymer which does not contain a polyisocyanate to the treated fabric in order to diminish the effect of atmospheric moisture on the treated fabric.

The synthetic yarn fabrics which have been bonded successfully by the use of the composition according to the present invention include nylon continuous filament yarn, nylon mixed continuous filament and staple yarn, Terylene continuous filament yarn (Terylene being the trademark for polyester fiber sold by Imperial Chemical Industries Ltd. of Great Britain), Terylene mixed continuous filament and staple yarn, mixed nylon and Terylene, mixed cotton and nylon, mixed cotton and Terylene, rayon, mixed rayon and nylon, mixed rayon and Terylene fabrics.

The rubber used in the composition according to the present invention may be natural or synthetic rubber such as nitrile rubber (butadiene-acrylonitrile copolymer), neoprene rubber (polychloroprene rubber) and oil-extended rubbers such as oil-extended SBR polymer (butadiene-styrene copolymer).

Polyisocyanates which are used in the composition are preferably liquid or low melting point solids. Examples of suitable polyisocyanates are 4,4'-di-isocyanate di-phenyl methane; 4,4'-di-isocyanate, 3-methyl di-phenyl methane and dianisidene di-isocyanate.

It has been found that improved bonding properties are exhibited by the composition when a secondary polymer is introduced into the composition. Thus, the addition of neoprene to a composition comprising natural rubber or oil-extended SBR polymer and the addition of nitrile rubber to a composition comprising the polyvinyl chloride have shown improved bonding characteristics.

Plasticizers such as di-(methoxy-ethyl) phthalate, dimethyl phthalate, di-ethyl phthalate, di-octyl phthalate, triacetin, tripropionin, triphenyl phosphate, tricresyl phosphate, dibutyl tartrate, camphor, di-2-ethyl-hexyl sebacate, trixylyl phosphate and dibutyl phthalate may be added to a composition comprising polyvinyl chloride or a co-polymer of vinyl chloride and vinylidene chloride.

In practice, th polyisocyanate is added to the composition immediately before the frictioning technique is used to introduce the composition into the fabric base. Thus, in the production of belting, the polyisocyanate is added to the composition in a cold open 2-roll mill and the composition is then frictioned on to a fabric.

The amount of each component used in the composition according to the present invention is determined by the required characteristics of the final product such as conveyor belting or hose. Generally, however, the compositions used are as follows. In a composition comprising natural rubber, the following formulation has been found of particular value:

(1)

| | Parts by weight |
|---|---|
| Natural rubber | 100 |
| Polychloroprene | 0–100 |
| Peptizers | 0–1 |
| Zinc oxide | 5–20 |
| Stearic acid | 0.5–3 |
| Carbon black | 0–50 |
| Oils | 0–10 |
| Accelerators | 0.1–2 |
| Sulphur | 1–5 |
| Polyisocyanate | 5–30 |

When oil-extended SBR polymer is used, the amounts are similar to the above formulation, the oil-extended SBR polymer replacing the natural rubber.

In a composition comprising polyvinyl chloride or a copolymer of vinyl chloride and vinylidene chloride, the following composition has been found generally suitable:

(2)

| | Parts by weight |
|---|---|
| PVC or copolymer | 100 |
| Butadiene/acrylonitrile copolymer | 5–100 |
| Plasticizer | 10–100 |
| Stabilizer | 1–4 |
| Carbon black | 0–20 |
| Polyisocyanate | 5–30 |

Generally, the treated fabric is skim coated with another layer of rubber, synthetic rubber or polyvinyl chloride which does not contain a polyisocyanate in order to reduce the effect of moisture on the intermediate product. In order to construct the length of belting using fabric impregnated by the method described above, successive layers are superimposed, covers are applied and the whole is amalgamated to form a laminated belt in a platen press or on a heated drum. Amalgamation is carried out at a temperature from 250–320° F. under pressure and, in the case of thermoplastics, it is necessary to cool under pressure.

The invention is further illustrated by the drawing and by the following examples in which the parts represent parts by weight.

The single figure of the drawing represents an oblique view of a conveyor belt embodying the present invention.

Referring to the drawing, the conveyor belt 10 is comprised of three plies of synthetic yarn fabric reinforcement 11, 11 coated with the coating composition which forms the subject of this invention. A rubber or plastic cover member 12 overlies the plies 11, 11. The plies 11, 11 and cover member 12 all are vulcanized simultaneously in a press to amalgamate the various components of the belt into a unitary structure.

*Example I*

50 parts of Geon 202 (a copolymer of polyvinyl chloride and vinylidene chloride), 50 parts of Polysar Krynac 803 (a butadiene-acrylonitrile polymer), 25 parts of trixylyl phosphate, 2 parts of calcium stearate were compounded in a Banbury mixer at a temperature within the range 285–302° F. 10 parts of Suprasec D (a polyisocyanate) and 5 parts of carbon black were introduced into the composition on a cool open 2-roll mill and immediately frictioned into a Terylene fabric at temperatures between 158–194° F. The frictioned fabric was then skim coated with a composition comprising polyvinyl chloride and co-polymer of vinyl chloride and vinylidene chloride which did not contain a polyisocyanate. This composition was formed by compounding 50 parts Geon 101 (polyvinyl chloride), 50 parts Geon 202, 20 parts Polysar Krynac 803, 2 parts calcium stearate, 80 parts trixylyl phosphate and 2 parts carbon black. The frictioned and skim coated fabric was then run into a liner cloth. A four-ply belt constructed from this material was formed in a press at a temperature within the range 280–320° F. for about fifteen minutes and was then cooled under pressure. Satisfactory adhesion was shown between the coating composition and the Terylene fabric which had been treated. Using a standard Goodbrand tensile testing machine the load to peel the PVC covers and the fabric plies was recorded at a jaw separation speed of 2 inches per minute. The average loads required to peel the covers and plies were 30 lbs. and 37 lbs. per linear inch width respectively.

*Example II*

The following friction compound based essentially on natural rubber was prepared on an open 2-roll mill:

| | Parts by weight |
|---|---|
| Natural rubber (smoked sheets) | 85 |
| Polychloroprene (neoprene AC) | 15 |
| Peptiser (zinc salt of pentachlorothiophenol) | 0.4 |
| Zinc oxide | 7.5 |
| Stearic acid | 2 |
| Carbon black (F.E.F.) | 5 |
| Dutrex R (plasticizer) | 7.5 |
| Phenyl β naphthylamine | 1 |
| M.B.T.S. (benzthiazyl disulphide) | 0.6 |
| Sulphur | 2.25 |

A paste containing 20 parts of a 4,4′-di-isocyanate diphenyl methane (Suprasec D) and 10 parts of carbon black (F.E.F.) was mixed and incorporated on a cool open 2-roll mill into the friction compound. This compound was immediately frictioned on the calendar, onto a 25 oz. 100 percent Terylene conveyor belting fabric to give a pick-up of approximately 50 percent. The frictioned fabric was subsequently coated on both sides (0.008″ thick) with a coating compound free of isocyanate to protect the polyisocyanate from atmospheric moisture. A 4-ply belt was fabricated with ⅛″ top and 1/16″ bottom covers and vulcanized in a press.

The following average bond strengths were shown by the belt when an adhesion test was carried out on a Goodbrand tensile testing machine:

| | Lbs. per linear inch width |
|---|---|
| Top rubber cover (⅛″) | 33.4 |
| Bottom rubber cover (1/16″) | 30.8 |
| Ply ½ | 65.7 |
| Ply ⅔ | 55.0 |
| Ply ¾ | 50.8 |

*Example III*

The method described in Example II was carried out but the friction compound based upon natural rubber was replaced by a compound formulated upon a blend of oil-extended SBR polymer and natural rubber.

The following compound illustrates a typical formulation:

| | Parts by weight |
|---|---|
| Oil-extended SBR (Intol 1710) | 35 |
| Natural rubber (smoked sheets) | 50 |
| Polychloroprene (neoprene W) | 15 |
| Zinc oxide | 7.5 |
| Stearic acid | 2 |
| Carbon black | 5 |
| Precipitated calcium carbonate | 10 |
| Liquid coumarone resin | 10 |
| Phenyl β naphthylamine | 1 |
| M.B.T.S. (benzthiazyl disulphide) | 1 |
| Sulphur | 1.5 |

The following average bond strengths were determined on a 4-ply synthetic fabric belt produced in the manner outlined in Example III:

| | Lbs. per linear inch width |
|---|---|
| Top rubber cover (⅛″) | 27 |
| Bottom rubber cover (1/16″) | 30 |
| Ply ½ | 34 |
| Ply ⅔ | 35 |
| Ply ¾ | 38 |

We claim:

A process for the production of a laminated product which comprises frictioning directly onto an uncoated layer of an organic synthetic yarn fabric a solvent-free composition comprised of a blend of (a) a polyisocyanate and (b) a polymer selected from the group consisting of natural rubber, synthetic rubber, polyvinyl chloride, copolymers of vinyl chloride and vinylidene chloride, and mixtures thereof, coating the frictioned synthetic yarn fabric layer with a polymeric composition free of isocyanate, covering at least one of the frictioned synthetic yarn layers coated with the said polymeric composition with a cover of polymeric composition, and heating the resulting assembly under heat and pressure to amalgamate the assembly into a unitary structure.

References Cited by the Examiner

UNITED STATES PATENTS

| 2,766,164 | 10/1956 | Salem. | |
| 2,929,737 | 3/1960 | Tischbein | 117—76 |
| 3,090,716 | 5/1963 | Stevens | 161—144 X |

FOREIGN PATENTS

| 207,823 | 5/1957 | Australia. |
| 821,427 | 10/1957 | Great Britain. |
| 870,734 | 6/1961 | Great Britain. |

EARL M. BERGERT, *Primary Examiner.*

P. DIER, *Assistant Examiner.*